(12) United States Patent
Jean

(10) Patent No.: US 6,700,346 B2
(45) Date of Patent: Mar. 2, 2004

(54) MOTOR DRIVING CIRCUIT WITH A MOTOR FAILURE DETECTING FUNCTION

(75) Inventor: Rone-Fue Jean, Miao Li (TW)

(73) Assignee: Microtek International Inc. (TW)

( * ) Notice: Subject to any disclaimer, the term of this patent is extended or adjusted under 35 U.S.C. 154(b) by 19 days.

(21) Appl. No.: 09/995,688

(22) Filed: Nov. 29, 2001

(65) Prior Publication Data

US 2002/0105299 A1 Aug. 8, 2002

(30) Foreign Application Priority Data

Feb. 7, 2001 (TW) ........................................ 90102704 A

(51) Int. Cl.[7] ................................................. H02P 8/36
(52) U.S. Cl. ........................................ 318/685; 318/434
(58) Field of Search ................................ 318/434, 445, 318/484, 685, 696; 388/903, 921

(56) References Cited

U.S. PATENT DOCUMENTS

| | | | | |
|---|---|---|---|---|
| 3,931,559 A | * | 1/1976 | McKee ........................ 318/455 |
| 4,286,303 A | * | 8/1981 | Genheimer et al. ............ 361/24 |
| 4,528,486 A | * | 7/1985 | Flaig et al. .................. 318/254 |
| 4,553,075 A | * | 11/1985 | Brown et al. ................ 318/254 |
| 4,609,868 A | * | 9/1986 | Ferrari | |
| 4,642,543 A | * | 2/1987 | MacMinn .................... 318/696 |
| 4,856,078 A | * | 8/1989 | Konopka .................... 388/831 |
| 4,924,158 A | * | 5/1990 | Kelley et al. ................ 318/434 |
| 5,448,143 A | * | 9/1995 | Pecone ........................ 318/434 |
| 5,457,364 A | * | 10/1995 | Bilotti et al. ................ 318/434 |
| 6,239,991 B1 | * | 5/2001 | Ajro et al. .................... 363/41 |

* cited by examiner

*Primary Examiner*—Bentsu Ro
(74) *Attorney, Agent, or Firm*—Birch, Stewart, Kolasch & Birch, LLP

(57) ABSTRACT

A motor failure detecting module and a motor driving circuit with the module are proposed. The driving circuit includes a sensing unit, a comparator, an AND gate, a switch and a failure detecting module. The sensing unit is to measure the current flowing through the motor and generating a detecting voltage. The comparator is used to compare the detecting voltage with a reference voltage and generate a compared signal. The AND gate receives the compared signal and a control signal and generates a motor driving signal to control the switch. The switch controls the coils of the stepping motor. And the failure detecting module is used to detect whether the motor is failure according to the frequency and/or duration of the compared signal.

4 Claims, 6 Drawing Sheets

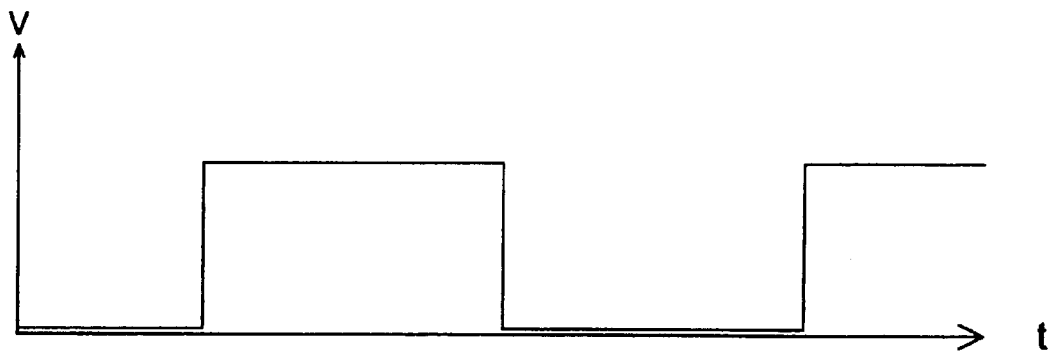
FIG. 2 (A) (PRIOR ART)
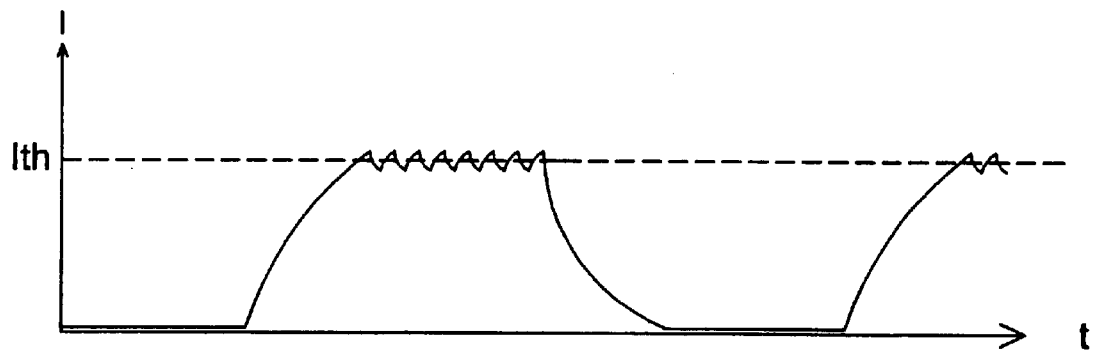
FIG. 2 (B) (PRIOR ART)
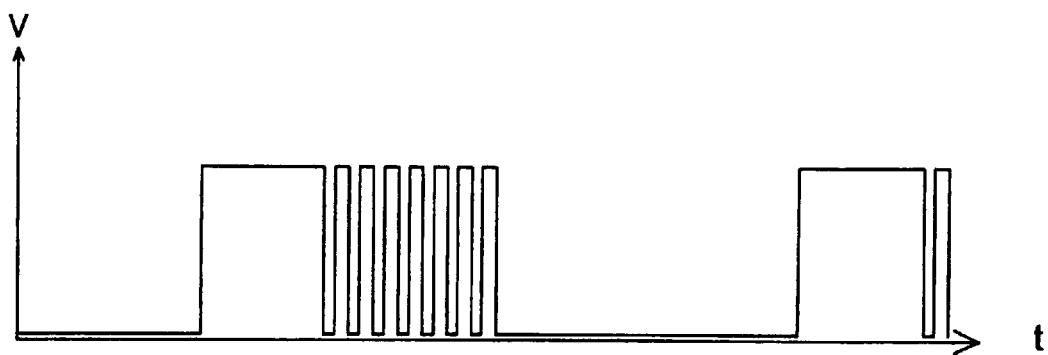
FIG. 2 (C) (PRIOR ART)

MOTOR DRIVING CIRCUIT WITH A MOTOR FAILURE DETECTING FUNCTION

BACKGROUND OF THE INVENTION

1. Field of Invention

The invention relates to a motor driving circuit and, in particular, to a motor driving circuit with a motor failure detecting module.

2. Related Art

As shown in FIG. 1, a driving circuit 100 for controlling one coil of a stepping motor contains a detection resistor 140, a comparator 120, an AND gate 110, and a switch 150. The driving circuit 100 uses the detection resistor 140 to detect the current flowing through the motor coil 130 and converts it into a detection voltage Vd. The comparator 120 compares the detection voltage Vd with a reference voltage Vref and generates a comparison signal. When the detection voltage Vd is lower than the reference voltage Vref, the comparison signal is logical H. The AND gate 110 receives a control signal and the comparison signal and generates a driving control signal. The driving control signal controls the action of the switch 150, whereby controlling the power of the motor coil 130.

With reference to FIG. 2, FIG. 2(A) shows the control signal corresponding to a coil of a stepping motor, FIG. 2(B) shows the current in the motor coil 130, and FIG. 2(C) depicts the driving control signal. When the current signal of the motor coil is greater than a threshold Ith, the driving circuit 100 switches off the transistor switch 150 to cut the power supply of the motor coil 130. When the current signal of the motor coil is lower than the threshold Ith, the driving circuit 100 switches on the transistor switch 150 to supply power to the motor coil 130. Therefore, the driving circuit 100 produces a driving control signal shown in FIG. 2(C).

As the scanning speed of the scanner becomes faster, the rotation speed of its driving motor (stepping motor) also increases. In order to make the stepper rotating at high speed, one usually uses the motor acceleration/deceleration method to make the motor rotate according to a pull out curve. However, the high speed stepping motor is likely to fail due to faults in acceleration/deceleration curves or an inhomogeneous friction from the driving load. Usually, scanners use a home position detector to detect the motion of the motor. If the home position detector has no action after the motor moves a couple of steps, the motor must have failed. The drawbacks of this method are that a longer detection time is needed and that only failure in the direction toward the home position detector can be detected. Therefore, to make the stepping motor normally operate without interrupting the scanning, the motor driving circuit has to have the function of detecting motor failure. The controller of the scanner can immediately receive the information about motor failure, and restart the stepping motor by increasing or decreasing the rotation speed of the motor.

SUMMARY OF THE INVENTION

In view of the foregoing, an objective of the invention is to provide a motor driving circuit with the function of detecting motor failure.

Another objective of the invention is to provide a motor driving circuit that determines motor failure by detecting current changes of the motor.

The disclosed motor driving circuit contains a detection resistor, a comparator, an AND gate, and a failure detecting module. The detection resistor detects the current flowing through the motor and generates a detection voltage. The comparator compares a reference voltage with the detection voltage. The AND gate receives a motor control signal and a comparison signal and generates a motor driving signal to drive the motor. The failure detecting module detects whether the motor has failed according to the current variation in the motor.

In the disclosed motor driving circuit, the failure detecting module computes the first enable cycle time of the motor driving signal when the motor control signal is enabled. If the first enable cycle time is smaller than a threshold, then it means that the motor has failed.

The failure detecting module also computes the number of pulses in the motor driving signal when the motor control signal is enabled. If the number of pulses is greater than a threshold number of pulses, then the motor has failed.

BRIEF DESCRIPTION OF THE DRAWINGS

The present invention will become more fully understood from the detailed description given hereinbelow illustration only, and thus are not limitative of the present invention, and wherein:

FIG. 2(A) shows the control signal of the motor in FIG. 1;

FIG. 2(B) shows the current signal of the motor coil of the motor in FIG. 1;

FIG. 2(C) shows the driving control signal of the motor in FIG. 1;

DETAILED DESCRIPTION OF THE INVENTION

Since a stepping motor can be considered as an inductance load, the current flowing through the inductance increases with time when a fixed voltage is supplied on both ends of the inductor. When the motor is normally operating, the increase speed of the current is decreased due to the EMF (Electric Motif Force) of the motor. When the motor fails, the current variation on the coil is faster. Therefore, one can use this property to determine whether the motor has failed.

Figure 1:
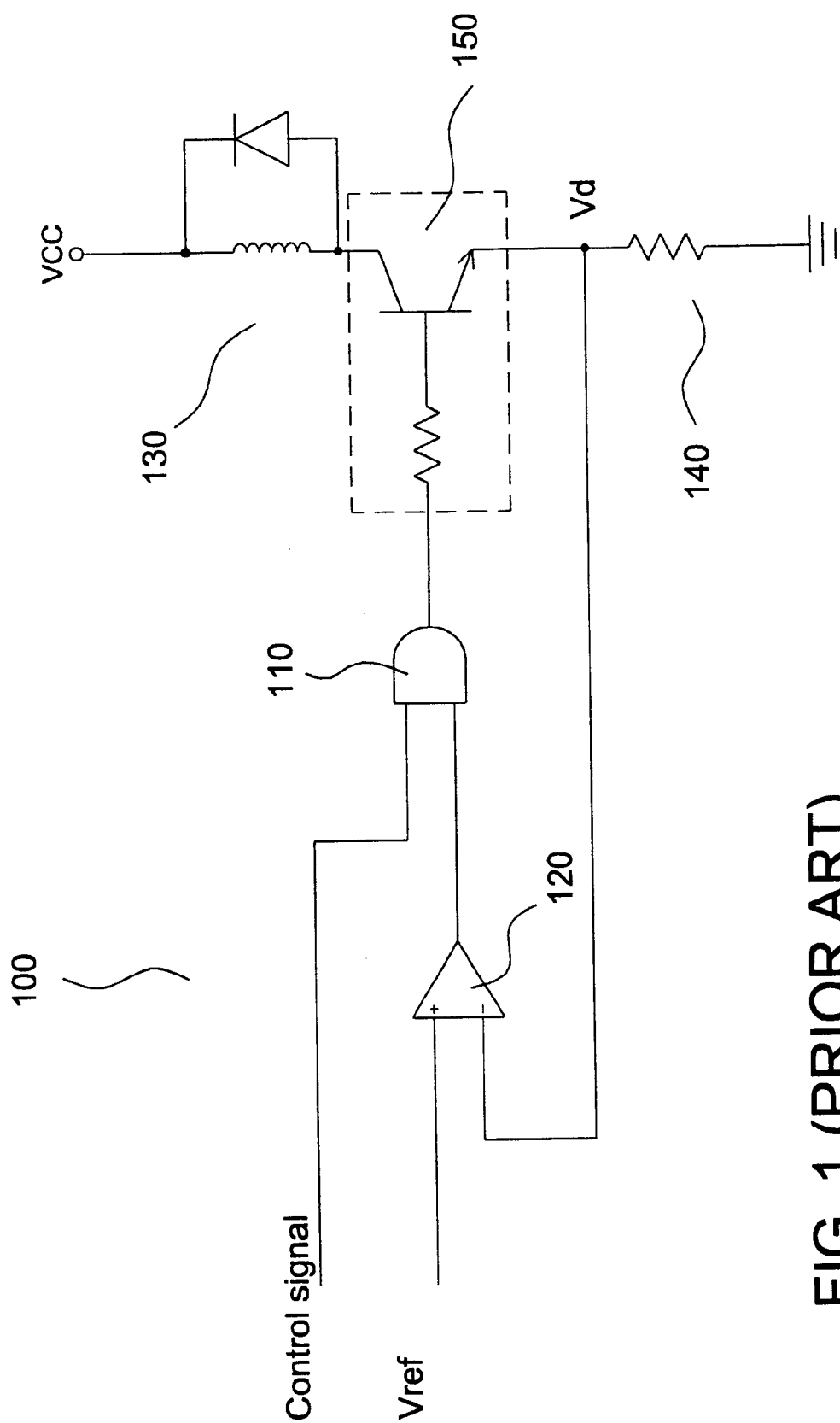
FIG. 1 is a motor driving circuit of a conventional stepping motor.
Figure 3:
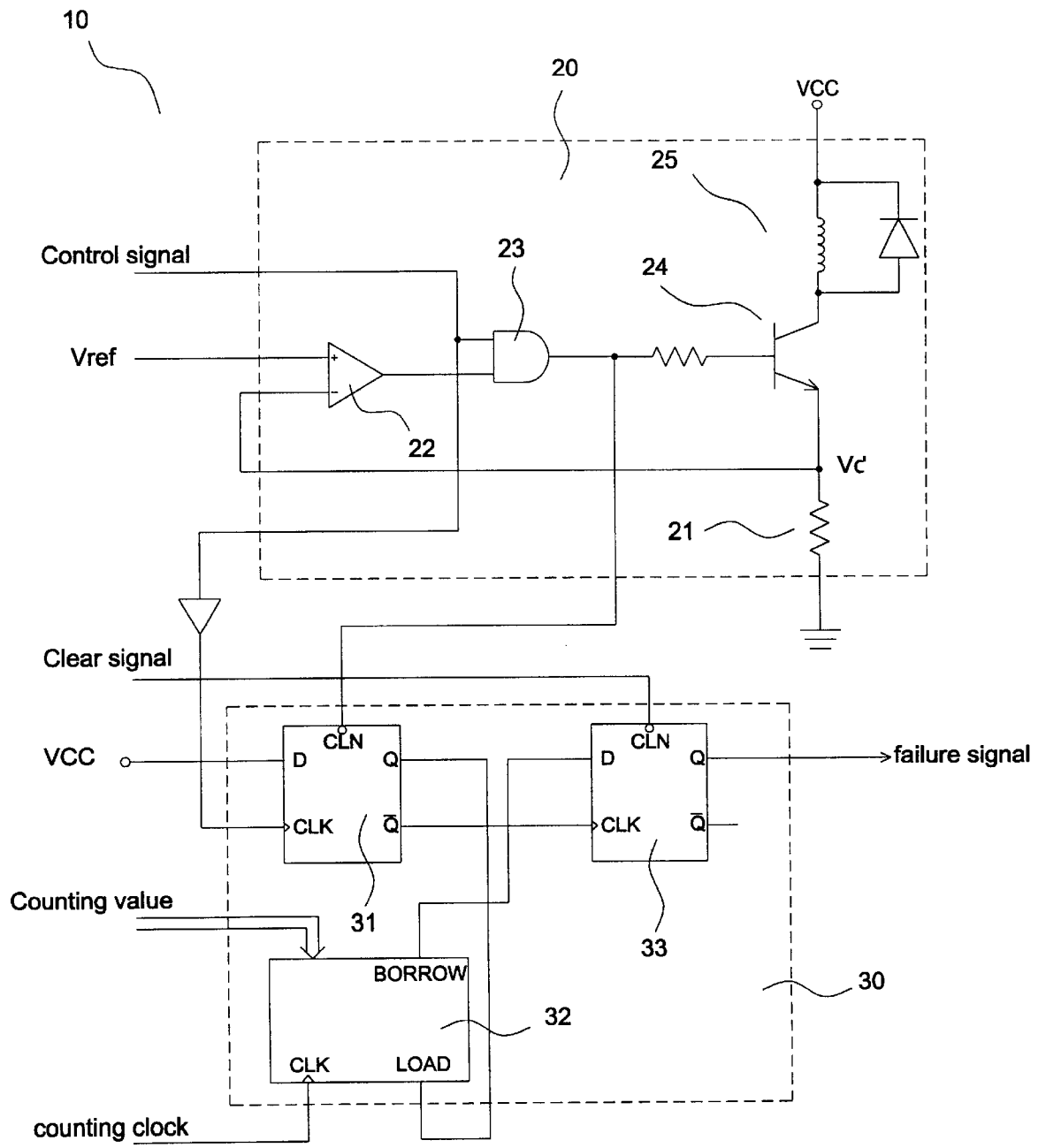
FIG. 3 shows a first embodiment of the disclosed motor driving circuit.

As shown in FIG. 3, a first embodiment of the disclosed motor driving circuit 10 for detecting whether a motor has failed includes a driving unit 20 and a failure detecting module 30. The driving unit 20 for driving one coil of a stepping motor includes a detection resistor 21, a comparator 22, an AND gate (control unit) 23, and a switch 24. The driving unit 20 is the same as the conventional motor driving circuit (see FIG. 1) and is not described here again. We will only describe the failure detecting module 30 in the following paragraphs.

The failure detecting module 30 in FIG. 3 computes a first Charge Time CT of the stepping motor when a Control Signal CS is enabled, which Control Signal CS is used to control the corresponding coil. When the Charge Time CT is smaller than a time threshold while the Control Signal CS is enabled, it means that the stepping motor has failed. The failure detecting module 30 includes a first D-type flip-flop 31, a second D-type flip-flop 33, and a countdown counter 32.

The first D-type flip-flop 31 uses the Control Signal as a trigger signal and uses the output signal (driving signal) from the AND gate 23 of the driving unit 20 as a clear signal. Therefore, when the Control Signal is enabled and the switch 24 of the driving unit 20 first acts, the signal at the Q output terminal of the first D-type flip-flop 31 is at HIGH level. At the same time, the countdown counter 32 takes a counting clock signal as a pulse input signal. Thus, when the Q output terminal signal of the first D-type flip-flop 31 is at HIGH level, the counting value is loaded into the first D-type flip-flop 31 and the first D-type flip-flop 31 starts to countdown. A borrow flag is generated when it is counted to 0. The second D-type flip-flop 33 uses the negative Q output terminal of the first D-type flip-flop 21 as the trigger signal. The borrow flag of the countdown counter 32 is taken as a D input terminal of the second D-type flip-flop 33 and the Q output terminal of the second D-type flip-flop 33 is taken as a failure signal. At the same time, the second D-type flip-flop 33 receives a clear signal to clear the failure signal.

Figure 4A:
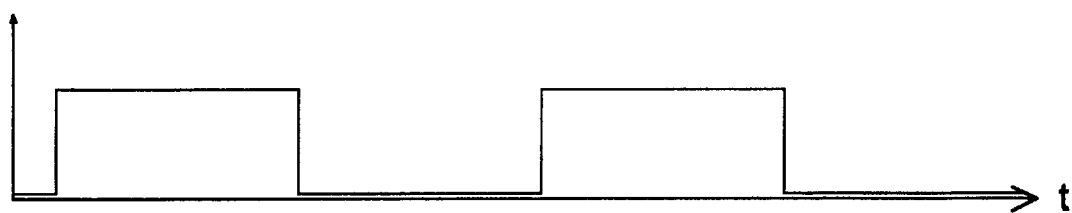
FIG. 4(A) is a timing diagram of the Control Signal in the motor driving circuit in FIG. 3.
Figure 4B:
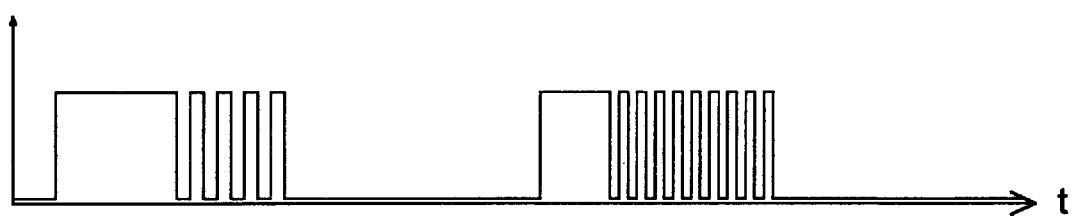
FIG. 4(B) is a timing diagram of the output signal of the AND gate in the motor driving circuit in FIG. 3.
Figure 4C:
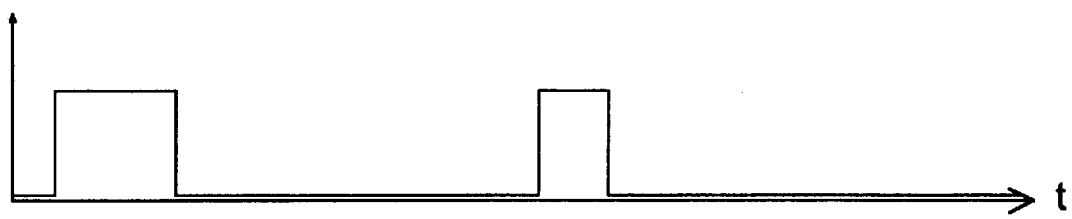
FIG. 4(C) is a timing diagram of the Q output terminal signal of the first flip-flop in the motor driving circuit in FIG. 3.
Figure 4D:
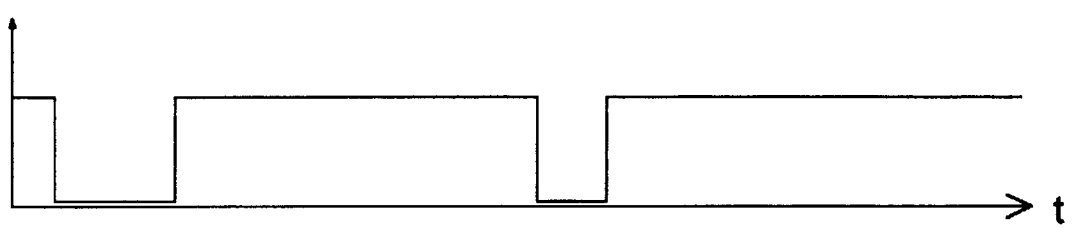
FIG. 4(D) is a timing diagram of the negative Q output terminal signal of the first flip-flop in the motor driving circuit in FIG. 3.
Figure 4E:
FIG. 4(E) is a timing diagram of the borrow signal in the motor driving circuit in FIG. 3.
Figure 4F:
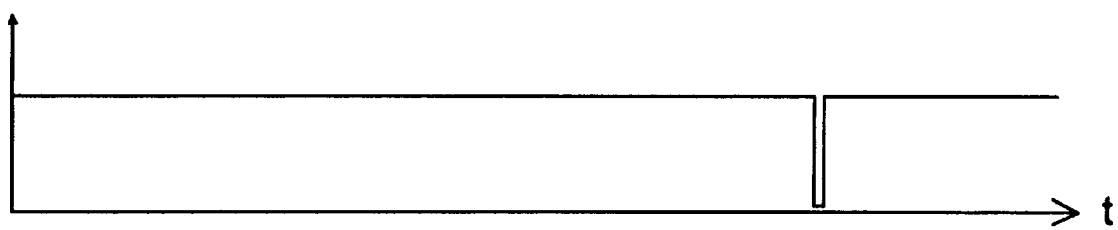
FIG. 4(F) is a timing diagram of the clear signal in the motor driving circuit in FIG. 3.
Figure 4G:
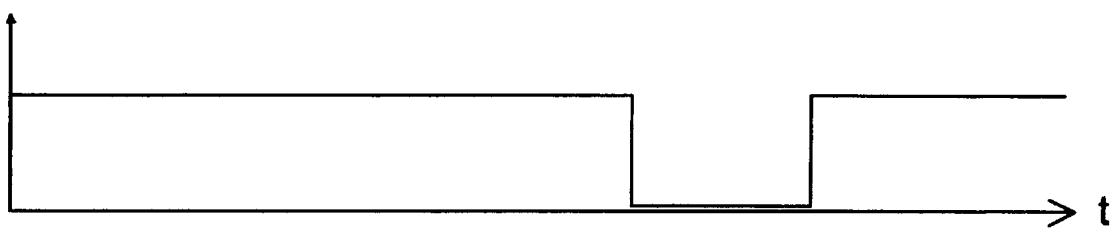
FIG. 4(G) is a timing diagram of the failure signal in the motor driving circuit in FIG. 3.

With reference to FIG. 4, FIG. 4(A) shows the Control Signal, FIG. 4(B) shows the output signal of the AND gate 23, FIG. 4(C) shows the Q output terminal signal of the first flip-flop 31, FIG. 4(D) shows the negative Q output terminal signal of the first flip-flop 31, FIG. 4(E) is the borrow signal, FIG. 4(F) is the clear signal, and FIG. 4(G) is the failure signal. From the signals shown in FIG. 4, one clearly sees that the Q output terminal signal of the first flip-flop 31 means the first charge signal of the stepping motor when the Control Signal is enabled. When the stepping motor is not failed, the first charge time will satisfy a threshold. Therefore, the borrow flag of the countdown counter 32 must be at HIGH level (FIG. 4(E)) so that the failure detecting module 30 does not send out a failure signal. When the stepping motor fails, the first charge time will be lower than a threshold due to the lack of the EMF. Thus, the borrow flag of the count-down counter 32 does not change to HIGH level; the failure detecting module 30 sends out a failure signal like the one shown in the last section of FIG. 4(G).

Figure 5:
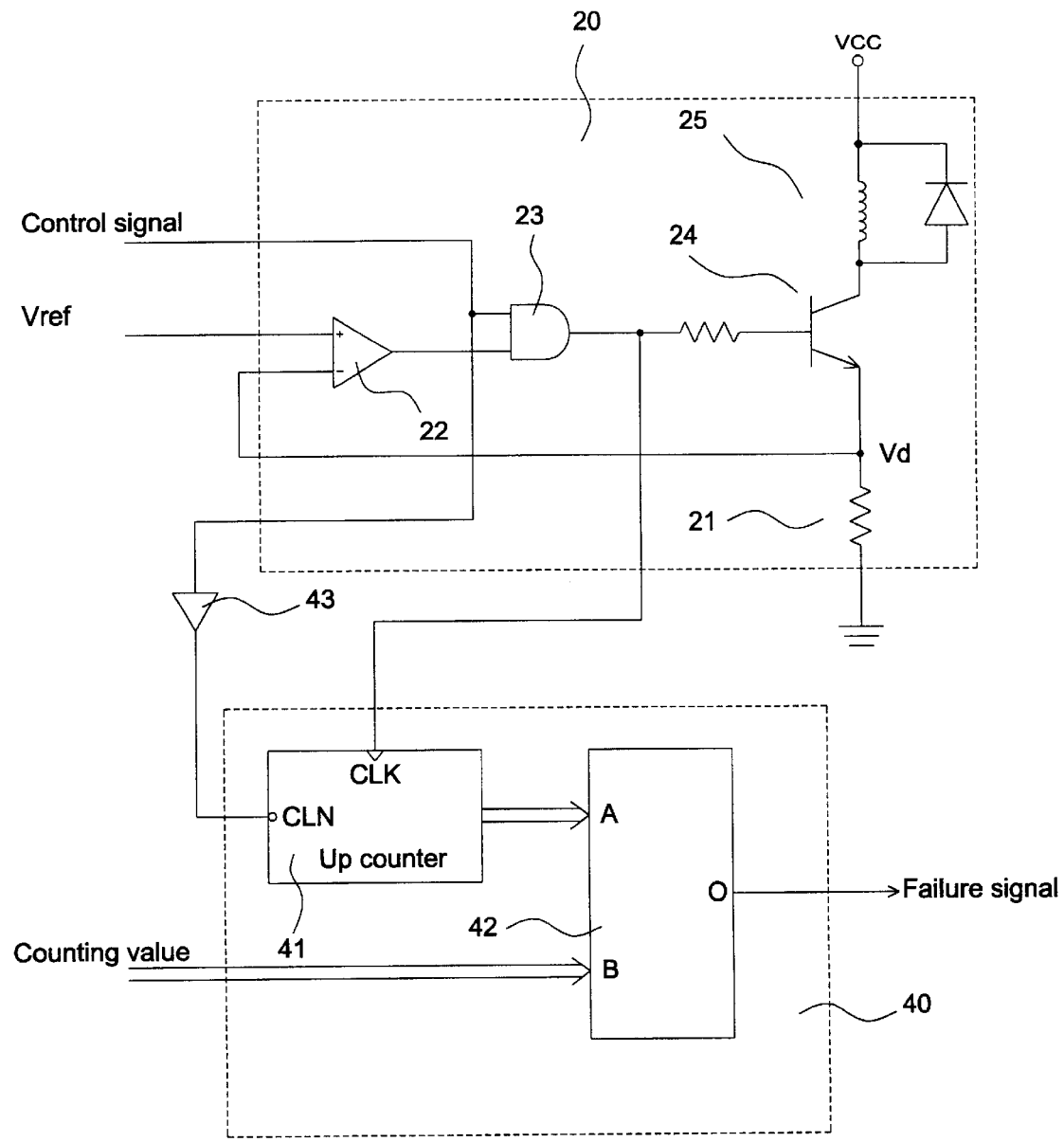
FIG. 5 shows a second embodiment of the disclosed motor driving circuit.

As shown in FIG. 5, the second embodiment of the invention computes the number of action times of a transistor 24 when each Control signal is enabled, i.e. the number of pulses in the output signal (driving signal) from the AND gate 23. When the number of pulses is over a threshold, then the motor is out of driving. As shown in the drawing, the failure detecting module 40 in this embodiment includes a up counter 41 and a comparator 42. The up counter 41 uses the output signal from the AND gate 23 as the trigger pulse and the Control signal as the clear signal. Therefore, the up counter 41 performs counting when the Control signal is enabled. When the Control signal is L, then it is kept at 0. The comparator 42 is used to compare the output value from the up counter 41 with a threshold. When the output value of the up counter 41 is greater than the threshold, then the comparator 42 outputs a failure signal.

The present invention uses a failure detecting module to detect the charge/discharge time or charge/discharge frequency, and uses the length of the charge/discharge time or the charge/discharge frequency to determine whether the motor has failed, providing the failure signal to the control circuit of a scanner. The scanner can thus modify motor control parameters and adjust control modes according to the failure signal to achieve the required image quality.

Certain variations would be apparent to those skilled in the art, which variations are considered within the spirit and scope of the claimed invention. For example, when the stepping motor fails, its charge/discharge frequency increases and so does the action frequency of the driving unit switch. When the Control signal is enabled, the number of the switch actions is compared with a threshold to see if the motor has failed. Moreover, when the Control signal enable is over, the discharge time of the stepping motor is compared with a threshold to see if the motor has failed.

What is claimed is:

1. A motor failure detecting circuit for detecting the failure of a stepping motor controlled by motor control signals, the motor failure detecting circuit comprising:

a detection unit for detecting current variations of at least one coil of the stepping motor to generate a digital detecting signal;

a calculating unit for calculating the frequency of the digital detecting signal when a motor control signal corresponding to the coil is enabled; and a comparing unit for comparing the frequency with an threshold frequency and outputting a motor failure signal when the frequency is higher than the threshold frequency.

2. A motor driving circuit with a motor failure detecting function, comprising:

a driving unit for driving a stepping motor according to a motor control signal and generating a digital detecting signal for current variations of the motor; and a failure detecting module, which detects whether the motor has failed according to the digital detecting signal when the motor control signal is enabled, the driving unit comprising:

a detection unit, which detects the current flowing through one of the coils of the stepping motor and generates a current detection signal;

a comparator, which compares the current detection signal with a reference signal and outputs a comparison signal;

a control unit for generating a motor driving signal according to the motor control signal and the comparison signal; and a switch, which receives the motor driving signal and drives the motor;

wherein the digital detecting signal is the motor driving signal, wherein the failure detecting module computes the number of pulses of the digital detecting signal when the motor control signal is enabled and the motor is determined to have failed if the number of pulses is greater than a threshold number.

3. The motor driving circuit of claim 2, wherein the failure detecting module contains:

a counter, which computes the number of pulses of the digital detecting signal when the motor control signal is enabled; and a comparator, which outputs a motor failure signal when the counting is over the threshold number of pulses.

4. A motor driving circuit with a motor failure detecting function, comprising:

a driving unit for driving a stepping motor according to a motor control signal and generating a digital detecting signal for current variations of the motor; and a failure detecting module, which detects whether the motor has failed according to the digital detecting signal when the motor control signal is enabled, the driving unit comprising:
a detection unit, which detects the current flowing through one of the coils of the stepping motor and generates a current detection signal;
a comparator, which compares the current detection signal with a reference signal and outputs a comparison signal;
a control unit for generating a motor driving signal according to the motor control signal and the comparison signal; and
a switch, which receives the motor driving signal and drives the motor;

wherein the digital detecting signal is the motor driving signal, wherein the failure detecting module computes a first enable cycle time of the digital detecting signal when the motor control signal is enabled and the motor is determined to have failed if the first enable cycle time is smaller than a threshold the failure detecting module comprising:
a first D-type flip-flop, which detects the first enable cycle time of the digital detecting signal;
a counter, which counts the first enable cycle when the Q output terminal of the first D-type flip-flop is enabled and outputs a flag signal when the counting is over the threshold; and
a second D-type flip-flop, which outputs a motor failure signal when the counting does not exceed the threshold.

* * * * *